(12) United States Patent
Wang et al.

(10) Patent No.: US 9,788,024 B1
(45) Date of Patent: Oct. 10, 2017

(54) SYSTEMS AND METHODS FOR ACHIEVING AD AVOIDANCE BY SELECTIVELY SWITCHING MEDIA STREAMS

(71) Applicant: Rovi Guides, Inc., San Carlos, CA (US)

(72) Inventors: Ti-Shiang Wang, Lexington, MA (US); William L. Thomas, Evergreen, CO (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/197,348

(22) Filed: Jun. 29, 2016

(51) Int. Cl.
| | |
|---|---|
| *H04N 21/234* | (2011.01) |
| *H04N 21/262* | (2011.01) |
| *H04N 21/458* | (2011.01) |
| *H04N 21/81* | (2011.01) |
| *H04N 21/438* | (2011.01) |
| *H04N 21/472* | (2011.01) |
| *H04N 21/45* | (2011.01) |
| *H04N 21/44* | (2011.01) |
| *H04N 21/2387* | (2011.01) |
| *H04N 21/278* | (2011.01) |

(52) U.S. Cl.
CPC ..... *H04N 21/23424* (2013.01); *H04N 21/234* (2013.01); *H04N 21/2387* (2013.01); *H04N 21/23406* (2013.01); *H04N 21/26258* (2013.01); *H04N 21/4383* (2013.01); *H04N 21/44004* (2013.01); *H04N 21/458* (2013.01); *H04N 21/4532* (2013.01); *H04N 21/47217* (2013.01); *H04N 21/812* (2013.01); *H04N 21/278* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2002/0194595 A1* | 12/2002 | Miller | H04H 20/10 725/36 |

(Continued)

*Primary Examiner* — Ricky Chin
(74) *Attorney, Agent, or Firm* — Haley Guiliano LLP

(57) ABSTRACT

Systems and methods are disclosed herein for avoiding playback of an advertisement by selectively switching between media streams. To this end, a media guidance application receives a plurality of media streams from different sources, switches to a first media stream and plays back a first media asset of the first media stream, and determines that an end to playback of the first media asset is imminent. The media guidance application then determines whether a second media stream of the plurality of media streams is within a threshold amount of time of playing back a beginning of a second media asset, and if the second media stream is within the threshold amount of time of playing back the beginning of the second media asset, the media guidance application switches from the first media stream to the second media stream and plays back the second media asset.

46 Claims, 5 Drawing Sheets

(56) References Cited

U.S. PATENT DOCUMENTS

| | | | |
|---|---|---|---|
| 2003/0110499 A1 | 6/2003 | Knudson et al. | |
| 2005/0240967 A1* | 10/2005 | Anderson | H04N 5/50 |
| | | | 725/52 |
| 2005/0251827 A1 | 11/2005 | Ellis et al. | |
| 2006/0212900 A1* | 9/2006 | Ismail | H04H 60/06 |
| | | | 725/34 |
| 2009/0235308 A1* | 9/2009 | Ehlers | H04H 20/106 |
| | | | 725/34 |
| 2010/0153885 A1 | 6/2010 | Yates | |
| 2010/0199299 A1* | 8/2010 | Chang | H04N 7/17318 |
| | | | 725/32 |
| 2011/0033167 A1* | 2/2011 | Arling | H04N 5/44 |
| | | | 386/234 |
| 2011/0164861 A1* | 7/2011 | Kunkel | H04N 5/76 |
| | | | 386/343 |
| 2013/0309986 A1* | 11/2013 | Cox | H04N 5/775 |
| | | | 455/179.1 |

* cited by examiner

SYSTEMS AND METHODS FOR ACHIEVING AD AVOIDANCE BY SELECTIVELY SWITCHING MEDIA STREAMS

BACKGROUND OF THE INVENTION

Streaming media has become prevalent in users' lives. Over the course of time, the types of sources from which users stream media has grown from simple broadcast sources (e.g., over the air television or radio) to a myriad of other sources, like over-the-top ("OTT") streaming media providers, Internet media distributers, Internet radio stations, and the like.

As streaming media increases in popularity, streaming media providers seek to increase revenue by embedding advertisements in the media streams (e.g., as commercials that are inserted in between playback of portions of a given program or song). Consumers have responded negatively to such advertising, as it is disruptive to the media consumption experience. Thus, technology was developed to either remove advertisements or make advertisements skippable in recorded versions of streaming media, or to offer users alternative content to an advertisement when an advertisement is detected in streaming media. In many cases, however, users may not wish to have to record media in order to avoid advertisements, and instead would like to consume the media when it is aired. Moreover, advertisers and media streaming sources have begun implementing sophisticated technology to disable mechanisms for removing advertisements, thus rendering efforts to thwart avoidance of viewing an advertisement by way of recording or inserting substitute content moot.

SUMMARY

Systems and methods are provided herein for avoiding advertisements by way of actively and intelligently switching between media streaming sources when playback of an advertisement is imminent or has occurred. The active switching process ensures that playback of non-advertisement content seamlessly occurs, while simultaneously ensuring that schema implemented by media content sources and third parties for forcing consumption of advertisement content is thwarted.

To this end, systems and methods are provided herein for avoiding playback of an advertisement by selectively switching between media streams. In some embodiments, a media guidance application may be executed by control circuitry of a user equipment. The media guidance application may receive a plurality of media streams, wherein each media stream of the plurality of media streams is received from a different source. For example, the media guidance application may receive streams of multimedia, like music (and may potentially also receive advertisements) from an FM radio station, an Internet radio station (e.g., Pandora), or an OTT music streaming provider. The media guidance application may be a master application that manages and switches between the received streams of multimedia, like music.

In some embodiments, the media guidance application may switch to a first media stream of the plurality of media streams (e.g., the Internet radio station), and may play back a first media asset of the first media stream, such as a song that is presently being played back by the first media stream.

In some embodiments, the media guidance application may determine that an end to playback of the first media asset is imminent. In some embodiments, this determination may be performed by first determining an identity of the first media asset. For example, the media guidance application may reference metadata transmitted with the first media asset, and the metadata may indicate the title of the first media asset. The media guidance application may then determine a length of the first media by, using a database, looking up the length in an entry of the database that corresponds to the identity. For example, an entry in a database may indicate a length of the media asset.

The media guidance application may go on to determine, based on the length, whether a threshold amount of the first media asset has yet to be played back. For example, the threshold may be a default setting, e.g., 15 seconds, where, if 15 seconds or less remains in the media asset, then the end of the media asset is near. Thus, the media guidance application, in response to determining that the threshold amount of first media asset has yet to be played back (e.g., there are fewer than 15 seconds remaining in the media asset), may determine that the end to the playback of the first media is imminent.

In some embodiments, the media guidance application may determine that the end to the playback of the first media asset is imminent by detecting a trigger signal in the first media stream, and, in response to detecting the trigger signal, determining that the end to the playback of the first media asset is imminent. For example, the media guidance application may detect an explicit signal that informs the media guidance application that the end to the playback of the first media asset is imminent, or may detect noise or background audio or color (e.g., a black screen) that indicates that a transition to an advertisement is occurring.

In some embodiments, the media guidance application, in response to determining that the end to the playback of the first media asset is imminent, may determine whether a second media stream of the plurality of media streams is within a threshold amount of time of playing back a beginning of a second media asset. For example, the media guidance application may determine that a second media asset will begin streaming on a second media stream in the next ten seconds, or has begun streaming within the last ten seconds. In response to determining that the second media stream is within the threshold amount of time of playing back the beginning of the second media asset, the media guidance application may switch from the first media stream to the second media stream, and may play back the second media asset.

In some embodiments, the media guidance application may access a profile of a user to whom the first media asset is being played back. For example, the preferences of the user may be loaded from a local or remote memory. These preference may, for example, arise from historical consumption data (e.g., multimedia that the user commonly consumes), or may arise from explicit user input (e.g., a user inputting data that states a preference for particular multimedia). The media guidance application may determine, based on data of the profile, whether the user prefers the first media asset or the second media asset, and may perform an action that affects playback of at least one of the first media asset and the second media asset based on the determination of whether the user prefers the first media asset or the second media asset.

In some embodiments, the media guidance application may detect that a portion of the playback of the first media asset overlaps with a portion of the playback of the second media asset, and may determine that that the user prefers the first media asset to the second media asset. Thus, when performing the action that affects playback of at least one of the first media asset and the second media asset the media guidance application, in response to determining that the user prefers the first media asset, may buffer the portion of the playback of the second media asset, may detect an end to the playback of the first media asset, and may, in response to detecting the end to the playback of the first media asset, play back the second media asset from a beginning of the buffered portion. For example, the media guidance application may avoid chopping or cutting off the last few seconds of a song that is playing of the first media stream because the user enjoys listening to the song, and may thus buffer the second media asset until such a time that the song ends, at which time the second media asset may be played back from its beginning without the user missing out on the overlapping portion.

Similarly, in some embodiments, the media guidance application may determine that the user prefers the second media asset to the first media asset. Accordingly, when the media guidance application performs the action that affects playback of at least one of the first media asset and the second media asset, the media guidance application may, in response to determining that the user prefers the second media asset, switch from the first media stream to the second media stream prior to detecting an end to the playback of the first media asset. For example, the media guidance application may chop the last few seconds of the first media asset, and may immediately move on to playback of the second media asset, thus moving to the song that the user prefers immediately.

In some embodiments, the media guidance application may determine, based on the user profile, whether a user prefers to play back an entirety of a given media asset even if user does not prefer the given media asset to a different media asset. For example, the user may dislike any song to be chopped, and may thus disable a setting that allows for chops, or may enable a setting that prevents chops. As another example, while the user may prefer the second media asset to the first media asset, the user may also sufficiently be interested in the first media asset to wish for the first media asset to not be cut off, and may thus implement the above-mentioned buffering mechanism for the second media asset even though the second media asset is preferred. Thus, in response to determining that the user prefers to play back the entirety of the given media even if the user does not prefer the given media asset to the different media asset, the media guidance application may refrain from performing the action that affects playback of at least one of the first media asset and the second media asset.

In some embodiments, the media guidance application, when determining whether the second media stream of the plurality of media streams is within a threshold amount of time of playing back a beginning of a second media asset comprises, may determine that the second media stream is within the threshold amount of time of playing back the beginning of the second media asset, and may also determine that a third media stream of the plurality of media streams is within the threshold amount of time of playing back the beginning of a third media asset. Thus, the media guidance application may have multiple choices of media streams to switch to.

In response to determining that the second media stream is within the threshold amount of time of playing back the beginning of the second media asset, and also in response to determining that the third media stream of the plurality of media streams is within the threshold amount of time of playing back the beginning of the third media asset, the media guidance application may determine, based on a profile of a user to whom the first media asset is being played back, that the user prefers the third media asset to the second media asset, and, may responsively switch from the first media stream to the third media stream. Thus, the media guidance application may select a media stream of several candidate media streams that is playing back a media asset (e.g., song) that the user prefers most.

In some embodiments, the media guidance application may determine that the second media stream is not within the threshold amount of time of playing back the beginning of the second media asset, and thus, that the second media stream is not a viable stream to switch to. Thus, in response to determining that the second media stream is not within the threshold amount of time of playing back the beginning of the second media asset, the media guidance application may determine whether any media stream of the plurality of media streams is playing back non-advertisement media, and may, in response to determining that a media stream is playing back the non-advertisement media, upon playback of the first media asset ending, switch from the first media stream to the media stream that is playing back the non-advertisement media. By doing so, the media guidance application may ensure a seamless switching to non-advertisement media, even if the non-advertisement media is not played back from substantially its beginning.

In some embodiments, the media guidance application may determine that no media stream of the plurality of media streams is playing back non-advertisement media (e.g., because every media stream is playing back an advertisement). In response to determining that no media stream of the plurality of media streams is playing back non-advertisement media, the media guidance application may switch from the first media stream to a media source that is not a media stream, and may play back a third media asset from the media source that is not the media stream. For example, the media guidance application may switch to a locally-stored media, such as a song stored on the user equipment, or a video stored on a digital video recorder (DVR).

DETAILED DESCRIPTION

Figure 1:
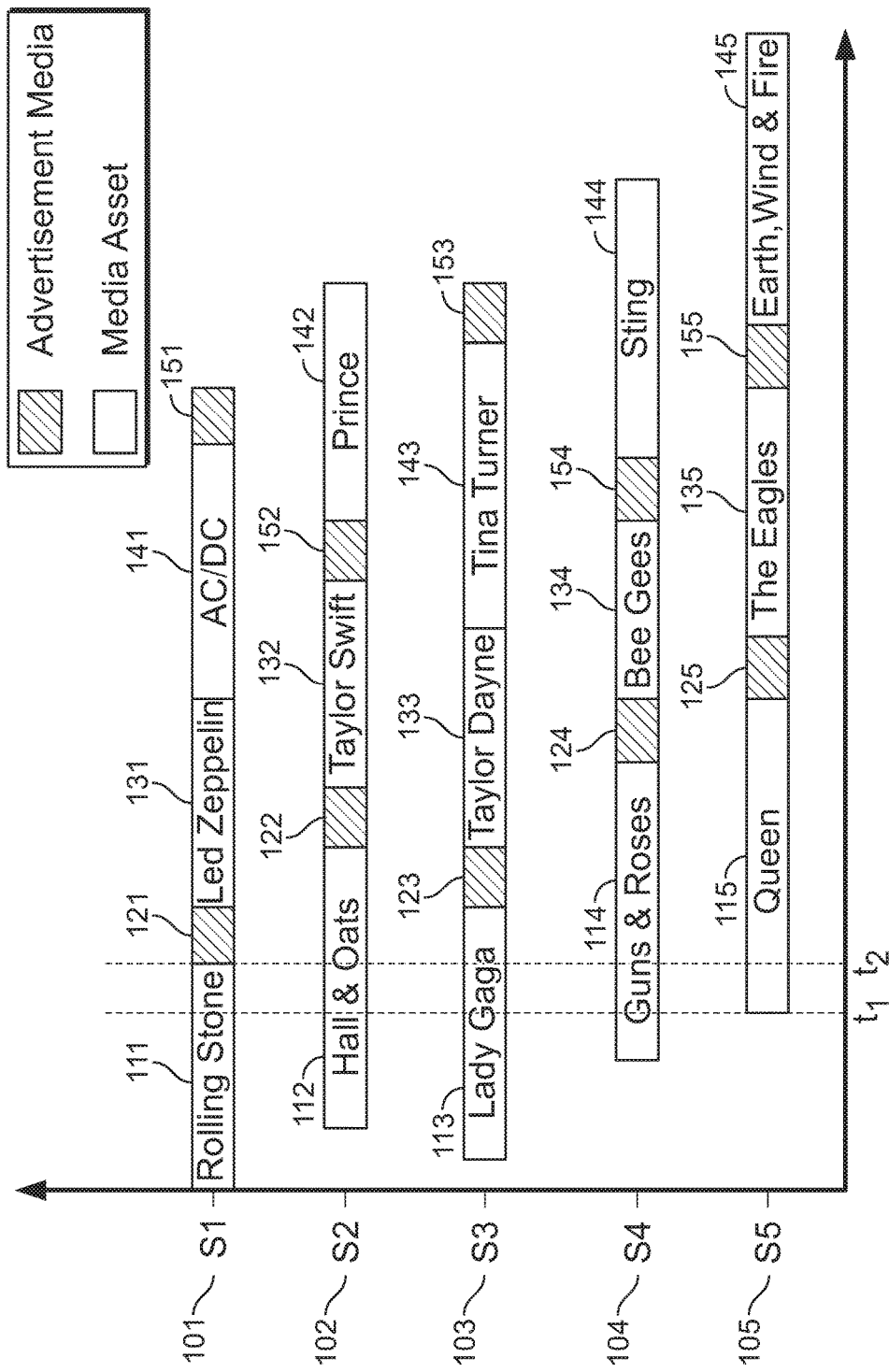
FIG. 1 depicts an illustrative embodiment of a switching diagram that depicts how a media guidance application may switch between different media streams, in accordance with some embodiments of the disclosure.

FIG. 1 depicts an illustrative embodiment of a switching diagram that depicts how a media guidance application may switch between different media streams, in accordance with some embodiments of the disclosure. The media guidance application may be executed by control circuitry of user equipment, as is described in further detail below with respect to FIGS. 2-5. Media streams 101, 102, 103, 104, and 105 may be any type of media content source, such as a broadcast television or radio source, an OTT media source, Internet source (e.g., Internet radio), or any other media content source described below with respect to FIGS. 2-5.

Media assets 111-115, 131-135, and 141-145, while depicted as songs, may be any media assets described below with respect to FIGS. 2-5. Advertisements 121-125 and 151-155 may be any advertisements, as described below with respect to FIGS. 2-5. While the term "advertisement" is used to describe advertisements 121-125 and 151-155, this term is not limited to advertisements, and may additionally refer to any media that is not consistent with a main use of a media stream. For example, a main use of a media stream provided by a radio service is playback of music or of a talk show; thus, chatter by disk jockeys, games, quizzes, entertainment updates, self-promotion spots, song dedications, or other non-music content is inconsistent with the main use of the media stream provided by the radio service. Thus, the term "advertisement" as used in this disclosure may equally refer to any such content that is not an advertisement, but is nevertheless inconsistent with the main use of a given media stream.

The media assets and advertisements described with respect to FIG. 1 are received by way of media streams 101-105. When a media asset or advertisement of FIG. 1 is referred to this may interchangeably refer to the actual media content or advertisement content itself, or the slot of time in which the media asset or advertisement content is being provided through its respective media source.

As depicted in FIG. 1, the media guidance application may receive streams of multimedia, such as music (and may potentially also receive advertisements) from multiple media content sources—namely, media streams 101-105, which, as described above and below, may be an FM radio station, an Internet radio station (e.g., Pandora), an OTT music streaming provider, and the like. The media guidance application may be a master application that manages and switches between the received streams of music. The word master application, as used herein, refers to an application that acts as a master with respect to other applications (sometimes referred to as "slave applications" herein). As a master, the master application may provide commands to the slave applications and/or to control circuitry of the user equipment that executes the master application, which the commanded entity shall execute. For example, the master application may command a slave application (e.g., a satellite radio station application) to change a station to which it is tuned. The master application may silence a slave application and run it to the background, and switch to a different slave application to which volume is enabled and which will be commanded to run in the foreground. The master application may enable and transmit any command that effects media guidance or media playback as described herein.

In some embodiments, the media guidance application may switch to a first media stream of the plurality of media streams (e.g., the Internet radio station). For example, the media guidance application may tune or switch to media stream 101. This may be done by switching from a dormant state (e.g., the master application is not effecting media consumption/playback at all) to an active state (the master application is now effecting media consumption/playback). Alternatively, this may be done by the media guidance application switching from a different media source (e.g., media stream 104) to media stream 101.

The media guidance application may switch to media stream 101 through any known mechanism for accessing an application or media stream, such as activating an application from which media stream 101 is received from a dormant state. If the application from which media stream 101 is received is active but is being run as a background application (e.g., where the media stream is received and processed by the user equipment, but is not played back), the media guidance application may run the application as a foreground application (such that media stream 101 is actually played back). In some embodiments, an application from which media stream 101 is received may run on a different user equipment from the user equipment on which the media guidance application is executed. For example, if a user is in a car, the media guidance application may command an FM radio attached to the car to power on and tune to a frequency corresponding to media stream 101. In any of these manners, and any other manner of which media stream 101 may be made accessible to the media guidance application, the media guidance application may play back media asset 111, which is a first media asset of the first media stream. As depicted, media asset 111 is a song by the musical artists, for example, the Rolling Stones.

In some embodiments, the media guidance application may determine that an end to playback of media asset 111 is imminent. In some embodiments, this determination may be performed by the media guidance application first determining an identity of media asset 111 (e.g., to determine a length of media asset 111, which can then be used to determine at what time media asset 111 will end). There are many ways in which to determine an identity of media asset 111, several of which will be detailed herein, but the disclosure contemplates any way to determine an identity of media asset 111.

In some embodiments, media asset 111 is a television broadcast, and is broadcast with auxiliary information, such as information in the vertical blanking interval ("VBI") of the broadcast itself, and/or auxiliary information transmitted in an auxiliary signal, such as an Internet signal. The auxiliary information may include any information describing media asset 111, such as its length, title, when it is to broadcast, and the like. The media guidance application may process this auxiliary information in any known manner (several known manners are discussed below with respect to FIGS. 2-5). Similarly, in some embodiments, media asset 111 may be broadcast over a radio station, and Radio Data System ("RDS") data may be sent with media asset 111. The RDS data is similar to that described above with respect to information auxiliary to a television broadcast, and may be processed by the media guidance application in similar ways. In some embodiments, media assets 111-115, 131-135, and 141-145 may be broadcast on a schedule, and the auxiliary information may be downloaded to a schedule database periodically, which the media guidance application may reference to learn of the auxiliary information.

In some embodiments, auxiliary and/or RDS data may be inaccessible or incomplete. Thus, in order to determine the length of media asset 111, the media guidance application may reference metadata transmitted with media asset 111

(e.g., the auxiliary or RDS data), and the metadata may indicate not indicate the length of media asset 111. In this instance, the media guidance application may learn the length of media asset 111 by learning some other identifying metadata relating to media asset 111, such as the title of the first media asset. The media guidance application may then determine a length of media asset 111 by using the identifying attribute (e.g., title) to look up the media asset in an entry of the database that corresponds to that attribute. In some embodiments, no metadata will be broadcast with media asset 111. Thus, the media guidance application may learn an identifying attribute of media asset 111 by sampling a portion of media asset 111 and comparing characteristics of the sampled portion to a database to learn the identity of media asset 111. This process, known in the art as fingerprinting, may be used to identify a media asset based on audio data or visual data alone. Using any of these techniques, the media guidance application may leverage an entry in a database that relates to media asset 111 to learn a length of the media asset.

The media guidance application may go on to determine, based on the length, whether a threshold amount of media asset 111 has yet to be played back. This threshold may be a number reflective of a maximum a unit of time (e.g., a number of a seconds) before a media asset is definitively about to end. The media guidance application (or an editor programming the media guidance application) may set the threshold differently for different types of media assets. For example, a thirty-minute television or on-demand program may be deemed to be about to end if five minutes are remaining, but a 3-minute song may be deemed about to end if only 15 seconds are remaining. The media guidance application may dynamically determine the threshold (e.g., as a function of the total length (such as, set the threshold to be 5% of the total time)), or the threshold may be assigned by default, by an editor or determined by a user's instruction or preference. When the media guidance application determines that the threshold amount of first media asset has yet to be played back, the media guidance application may determine that the end to the playback of the first media is imminent.

In some embodiments, metadata, auxiliary data, and length is not used by the media guidance application to determine that the end to the playback of the first media asset is imminent. Instead, the media guidance application may simply detect a trigger signal in media stream 101, and, in response to detecting the trigger signal, the media guidance application may determine that the end to the playback of the first media asset is imminent. A trigger signal, as used herein, may be any signal (e.g., interrupt) that expressly or impliedly indicates to the media guidance application that a media asset is about to end. An example of an implied indication may be, for example, when the media guidance application detects noise or background audio or color (e.g., a black screen that separates a program from a commercial) that indicates that a transition to an advertisement is occurring.

In some embodiments, the media guidance application, in response to determining that the end to the playback of media asset 111 is imminent, may determine whether a different media stream from media streams 102-105 is within a threshold amount of time of playing back a beginning of a second media asset. In other words, the media guidance application may determine whether any of media assets 112-115 either just recently began playing back, or are imminently going to have their playback begin, by streams 102-105. This threshold may be set in any manner described in the foregoing (e.g., as a function of how long a given media asset is, by an editor, or by a user's instruction or preference). Looking at FIG. 1, media asset 111 ends at time t2. At time t2 (or just before time t2, when time t2 is imminently approaching, as described above), the media guidance application may determine that media asset 115, which as depicted in FIG. 1 is a song by the rock band Queen, has recently begun at time t1. The media guidance application may compare t2 to t1, and may determine that t1 is within a threshold amount of time of t2. Thus, the media guidance application may responsively switch from media stream 101 to media stream 105 in order to play back media asset 115.

In some embodiments, the media guidance application may access a profile of a user to whom the media asset 111 is being played back. The profile, defined in further detail below with respect to FIGS. 2-5, may be a collection of preferences relating to a user. The profile may be stored locally to memory of the user equipment executing the media guidance application, or may be stored remote to the user equipment at a database, such as a media guidance data source or media content source, each of which are described in further detail below with respect to FIGS. 2-5. Among other things, the preference may be any attribute corresponding to multimedia. In the example of music, preferences may be, for example, genre (soft rock, heavy metal, live, unplugged), era (60's, 70's, 80's, 90's), or any other attribute corresponding of music. Similarly, for video, preferences may be genre or type (sitcom, drama), live video versus recorded video, video with a certain actor, or any other attribute. Preferences may be input by a user expressly, or may be learned by monitoring the user's activity. Preferences are discussed in further detail below with respect to FIGS. 2-5. The media guidance application may load the preferences of the user from the profile, whether it is stored on a local or remote memory, by transmitting a request to the memory for retrieving the preferences.

The media guidance application may determine, based on data of the profile, whether the user prefers the media asset 111 to a different media asset being broadcast by one of media streams 102-105. Based on this determination, the media guidance application may perform an action that affects playback of at least one of media asset 111 and media assets played by others of media streams 102-105. Some non-limiting examples of potential actions that affect playback are described below.

In some embodiments, the media guidance application may detect that a portion of the playback of the media asset 111 overlaps with a portion of the playback of a media asset to be switched to (e.g., media asset 115). For example, between t1 and t2, as depicted in FIG. 1, media asset 111 and media asset 115 have overlapping playback portions. Thus, the media guidance action may take a number of actions. For example, the media guidance application may immediately switch to media asset 115 at t1, effectively chopping the last part of media asset 111 from playback. As an alternative, the media guidance application may be enabled to buffer media asset 115 from t1, either to t2 or until media asset 111 has completed playback, and then may begin playback of media asset 115 from its beginning by leveraging the buffer. As another alternative, the media guidance application may play media asset 111 until time t2, and may chop the beginning of media asset 115 and simply switch to media stream 105 at t2, thus causing media asset 115 to begin playback from an intermediate position of the media asset. These possibilities are each explored in further detail below.

Following from the above, the media guidance application may determine (e.g., at time t1, time t2, or at a time when the end of media asset 111 is imminent) that the user prefers the media asset 111 to, e.g., media asset 115. Thus, when performing the action that affects playback of at least one of the media asset 111 and media asset 115 the media guidance application, in response to determining that the user prefers the first media asset, may buffer the portion of the playback of the second media asset (e.g., from time t1, either to t2 or until media asset 111 has completed playback, or from the time of the determination of t2). In some embodiments, this buffering may always occur. In some embodiments, the media guidance application may first determine, based on the user profile, whether the user is likely to enjoy media asset 115 notwithstanding that the user prefers media asset 111 to media asset 115, and may trigger this buffering when the user is likely to enjoy media asset 115. When the media guidance application detects an end to the playback of the first media asset (e.g., at time t2), the media guidance application may go on to play back media asset 115 from a beginning of the buffered portion. In this way, the media guidance application may avoid chopping or cutting off the last few seconds of, e.g., a song that is playing on media stream 101 because the user enjoys listening to that song, and may thus buffer media asset 115 until such a time that the song (i.e., media asset 111) ends, at which time the media asset 115 may be played back from its beginning without the user missing out on the overlapping portion.

Alternative to the foregoing, the media guidance application may determine that the user prefers the second media asset (e.g., media asset 115) to media asset 111. Accordingly, the action that affects playback of at least one of the first media asset and the second media asset comprises may be the media guidance application, in response to determining that the user prefers the second media asset, switching from media stream 101 to media stream 105 prior to detecting an end to the playback of media asset 111. For example, the media guidance application may chop the last few seconds of the first media asset (e.g., the portion of media asset 111 that would have been played back between times t1 and t2, the portion of media asset 111 that would have been played back between when the media guidance application determined that the end to media asset 111 was imminent, and the like), and may move on to playback of the media asset 115, thus quickly moving to the media asset that the user prefers, potentially immediately. The timing of the media guidance application implementing these playback operations is described in further detail below.

In some embodiments, the media guidance application may determine, based on the user profile, whether a user prefers to play back an entirety of a given media asset even if user does not prefer the given media asset to a different media. For example, the user may dislike any song or video to be chopped, and may thus disable a setting that allows for chops, or may enable a setting that prevents chops. This setting may be expressly enabled by the user (e.g., by way of a setup process using the media guidance application). Alternatively, the media guidance application may provide an option to undo a chop and switch back to a previous media stream, and the media guidance application may monitor the user's habits with respect to this option. If the user always or routinely reverts to a previous media stream after a song is chopped, the media guidance application may refrain from chopping songs in the future.

As another example, while the user may prefer the second media asset (e.g., media asset 115) to the media asset 111, the user may also sufficiently be interested in the first media asset to wish for the first media asset not to be cut off, and may thus implement the above-mentioned buffering mechanism for media asset 111 even though media asset 115 is preferred. The media guidance application may determine whether a user does not prefer cutoffs for a single song based on a relative level of preference of a user for a song relative to a threshold. For example, if the user's profile reflects a sufficient amount of attributes of media assets that the user enjoys (e.g., artist, style, genre, etc.) are in common with media asset 111, then the media guidance application may refrain from chopping media asset 111 even if a different song (e.g., media asset 115) is simultaneously playing back. Thus, in response to determining that the user prefers to play back the entirety of the given media asset even if the user does not prefer the given media to the different media asset, the media guidance application may refrain from performing an action that affects playback of the given media asset (e.g., media asset 111).

In some embodiments, the media guidance application may have multiple choices of which of media streams 102-105 to switch away to when media asset 111's end is imminent (e.g., because media assets from at least two of media streams 102-105 either have just started or are just about to start). In such a scenario, the media guidance application may determine, based on a profile of a user to whom media asset 111 is being played back, that the user prefers the third media asset (e.g., media asset 114) to the second media asset (e.g., media asset 115), and, may responsively switch from media stream 101 to the media stream 104. Thus, the media guidance application may select a media stream of several candidate media streams that is playing back a media asset (e.g., song) that the user prefers most. As described above, this switching may or may not may involve a chopping of either media asset 111 or 114, and may or may not involve a buffering of media asset 114. Optionally, the media guidance application may also buffer media asset 115 and play back media asset 115 at the conclusion of playback of media asset 114.

In some embodiments, the media guidance application may determine that none of media streams 102-105 are about to begin playback of a media asset when media asset 111's playback has an imminent end, and that none of media streams 102-105 have just recently begun playback of a media asset. In order to avoid advertisement media, the media guidance application may, in this scenario, determine whether any of media streams 102-105 is playing back non-advertisement media, and may, in response to determining that a media stream is playing back the non-advertisement media, upon playback of the first media asset ending, switch from the first media stream to the media stream that is playing back the non-advertisement media. By doing so, the media guidance application may ensure a seamless switching to non-advertisement media, even if the non-advertisement media is not played back from substantially its beginning. The determination of whether a given media stream is playing non-advertisement media or advertisement media may be made by way of any of the above-described markers—including VBI information, RDS information, and the like.

In some embodiments, the media guidance application may determine that no media stream of the plurality of media streams is playing back non-advertisement media (e.g., because every media stream is playing back an advertisement). This determination may be performed when an end of a media asset is determined to be imminent, as described above. In response to determining that no media stream of the plurality of media streams is playing back non-advertisement media, the media guidance application (e.g., at the end of playback of media asset 111 at time t2) may switch from the media stream 101 to a media source that is not a media stream, and may play back a third media asset from the media source that is not the media stream. The media source may be any local or remote source, such as a CD or DVD player, a BLU-RAY player, a DVR device, or any other local or remote storage device that contains a stored media asset which will be played back in response to a command (e.g., the media guidance application commanding a CD player to play back the CD's third track). In this manner, the user will seamlessly be switched to playback of a media asset and will avoid being subjected to advertisement media notwithstanding that no media stream is playing non-advertisement media.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
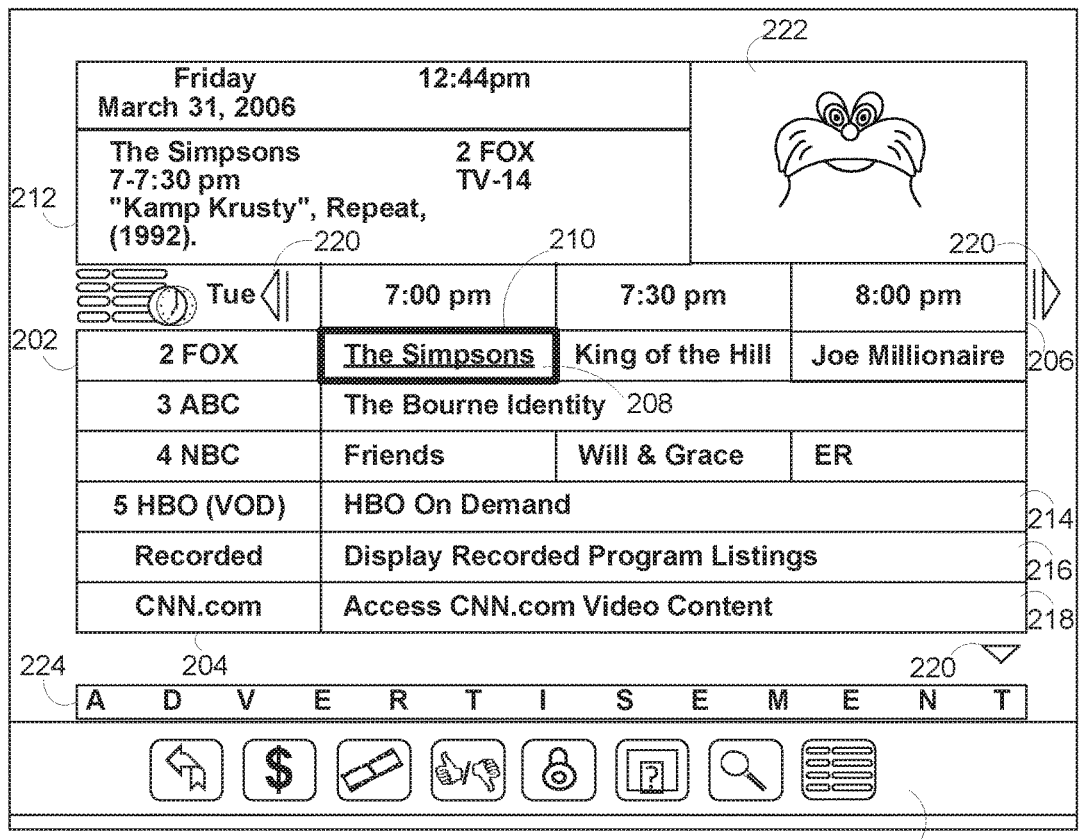
FIG. 2 shows an illustrative embodiment of a display screen that may be used to provide media guidance application listings and other media guidance information, in accordance with some embodiments of the disclosure.
Figure 3:
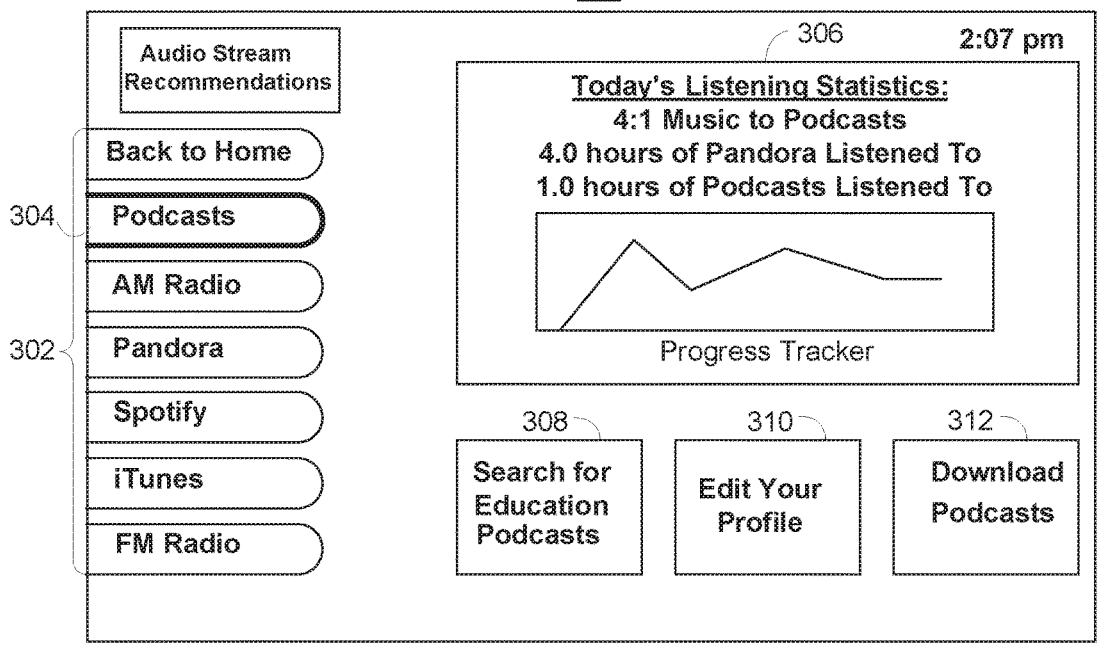
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Display 300 is a mosaic display that includes selectable options 302 for media stream recommendations, which may be organized based on content type, genre, and/or other organization criteria. While the media stream recommendations are for audio stream sources, any type of media stream may be recommended in selectable options 302. In display 300, Podcasts option 304 is presently selected, thus providing listings 306, 308, 310, and 312 as related to Podcasts. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including a media portion and text portion. Media portions and/or text portions may be selectable to view content in full-screen or to view information related to the content displayed in a media portion (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
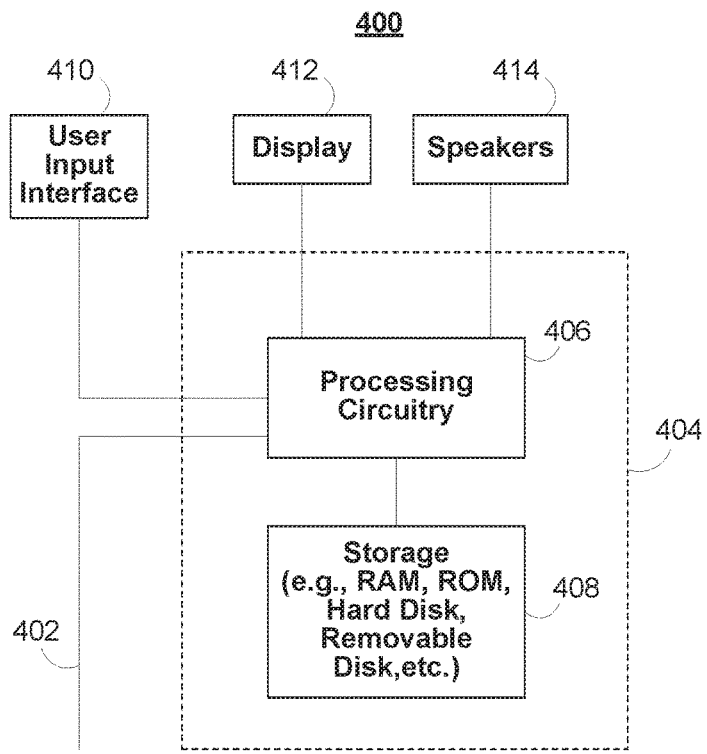
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
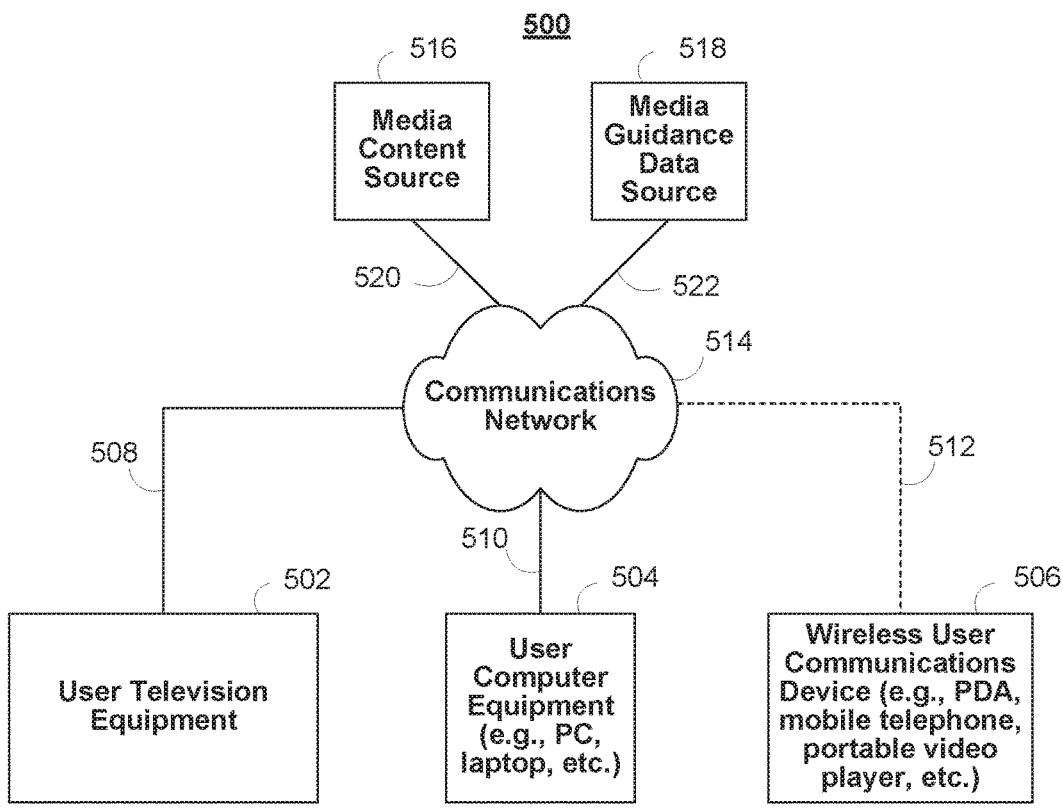
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine, a radio (e.g., a radio in a car), and any device that is capable of playing back over-the-air broadcasting (e.g., music, voice, or video broadcasting). For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired).

Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512.

Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
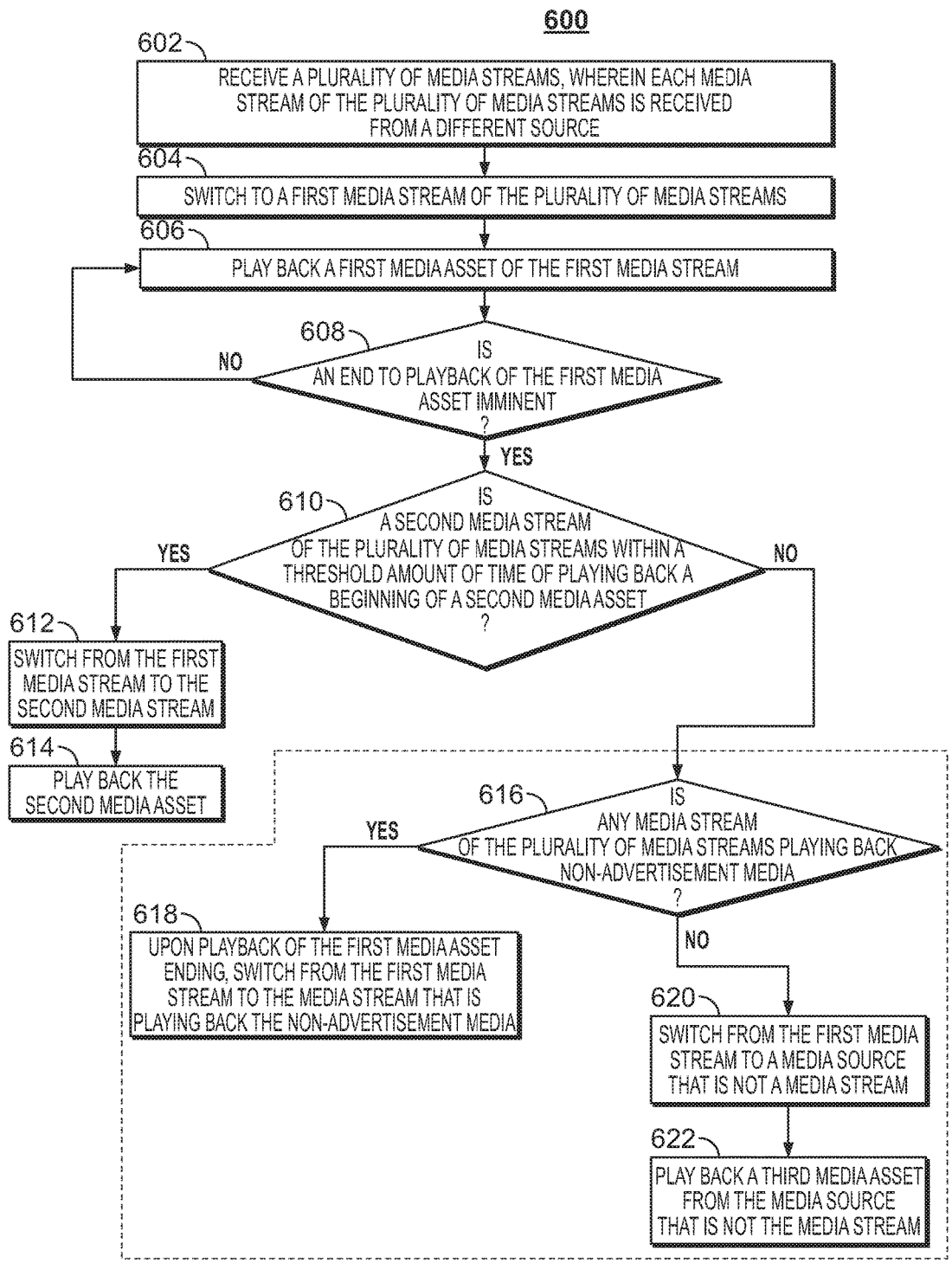
FIG. 6 depicts an illustrative flowchart of a process for seamlessly switching between media sources to avoid advertisement content, in accordance with some embodiments of the disclosure.

FIG. 6 depicts an illustrative flowchart of a process for seamlessly switching between media sources to avoid advertisement content, in accordance with some embodiments of the disclosure. Process 600 begins at 602, where a user equipment (e.g., user television equipment 502, user computer equipment 504, wireless user communications device 506, or any other type of user equipment suitable for accessing content) may use its control circuitry (e.g., control circuitry 404) to execute a media guidance application. The media guidance application may receive a plurality of media streams (e.g., media streams 101-105), where each media stream is received from a different source (e.g., different radio stations, different platforms (OTT provider, on-demand, Internet radio, etc.)), as described above. The different sources may each be any source described with respect to media content source 516.

Process 600 continues to 604, where the media guidance application may switch to a first media stream of the plurality of media streams. For example, the media guidance application may switch to media stream 101 from a default or dormant state, or from a different media stream (e.g., media stream 103), or in any manner described above. Process 600 may then continue to 606, where the media guidance application may play back a first media asset of the first media stream, such as media asset 111. The media guidance application may play back the media asset at the same user equipment that executes the media guidance application, or at a different user equipment. The media asset may be played back using display 412 or speakers 414.

Process 600 then continues to 608, where the media guidance application may determine whether an end to playback of the first media asset is imminent. This determination may be performed in any manner described above. If an end to playback is not imminent, playback described with reference to 606 continues. If an end to playback is imminent, process 600 continue to 610, where the media guidance application determines whether a second media stream of the plurality of media streams is within a threshold amount of time of playing back a beginning of a second media asset. For example, as described above, the media guidance application may determine whether any of media streams 102-105 have just started or are just about to begin playback of a media asset. If the determination is in the affirmative, process 600 continues to 612, and if the determination is in the negative, process 600 continues to 616. The scope of the disclosure includes the notion of excluding either the elements of process 600 associated with a negative or positive determination, where a determination associated with excluded elements will not result in execution of those elements. This is indicated in FIG. 6 by a box with dashed lines.

At 612, the media guidance application may switch from the first media stream (e.g., media stream 101) to the second media stream (e.g., media stream 105), in any manner described above. At 614, the media guidance application may play back the second media asset (e.g., media asset 115). Thus, playback of advertisement media 121 is avoided by switching before a beginning of advertisement media 121's playback.

If no media streams are playing a media asset that has just begun, as determined at 610, process 600 proceeds to 616, where the media guidance application may determine whether any media stream of the plurality of media streams is playing back non-advertisement media. If the determination is in the affirmative, process 600 continues to 618, where, upon playback of the first media asset (e.g., media asset 111) ending, the media guidance application may switch from the first media stream (e.g., media stream 101) to the media stream that is playing back the non-advertisement media (e.g., media stream 104, playing back media asset 124).

If however, the determination of 616 is in the negative, the media guidance application may switch from the first media stream to a media source that is not a media stream, and may play back a third media asset from the media source that is not the media stream. For example, as described above, the media guidance application may access a song or video stored at a local hard drive or DVR device in order to avoid playback of advertisement media.

Figure 7:
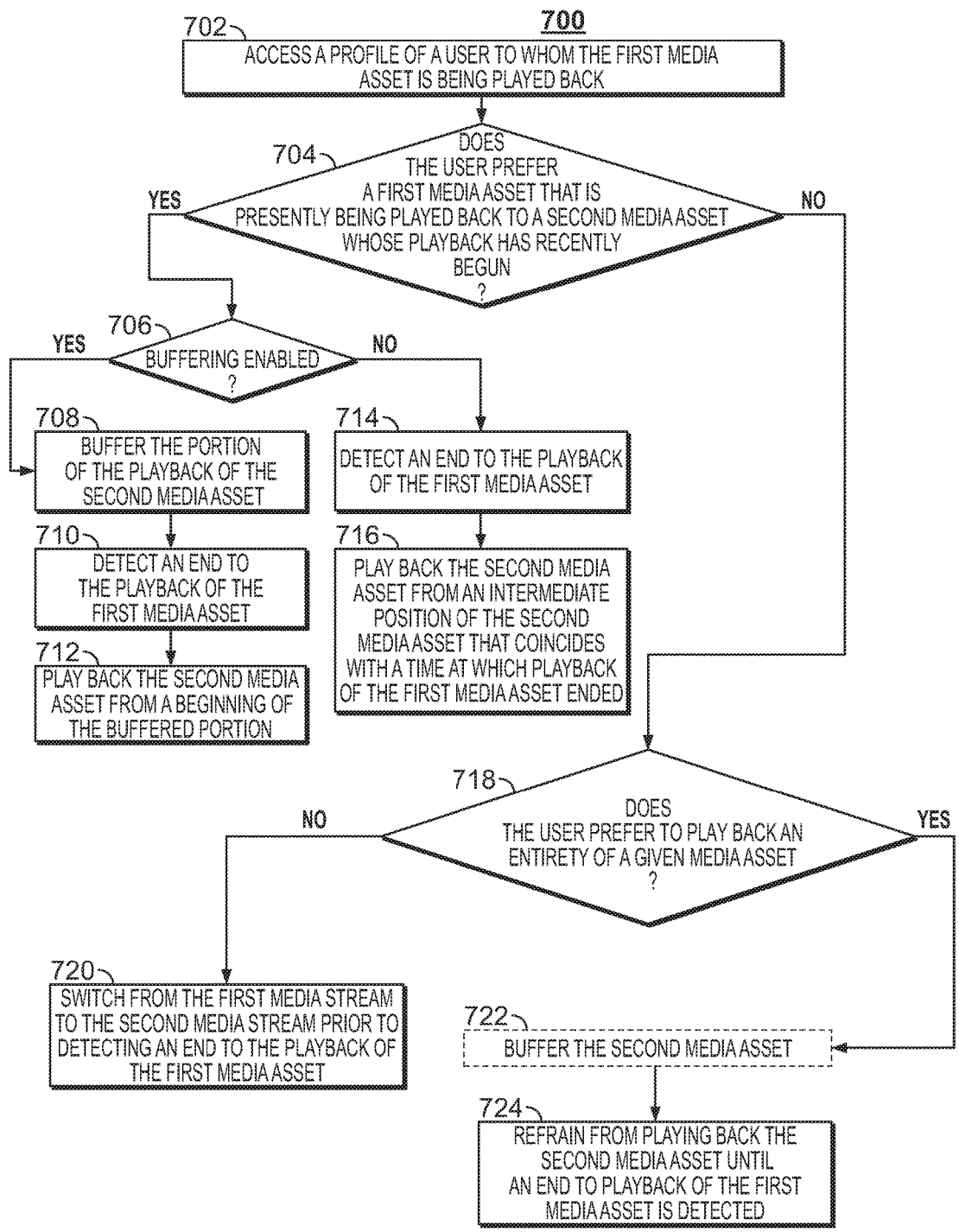
FIG. 7 depicts an illustrative flowchart of a process for leveraging profile information in order to switch between media sources in a manner tailored to a specific user, in accordance with some embodiments of the disclosure.

FIG. 7 depicts an illustrative flowchart of a process for leveraging profile information in order to switch between media sources in a manner tailored to a specific user, in accordance with some embodiments of the disclosure. Process 700 begins at 702, where a media guidance application may access a profile of a user to whom the first media asset is being played back. As described above, the profile may be stored locally to the user equipment (e.g., at storage 408), or remote to the user equipment (e.g., at media guidance data source 518 or media content source 516, accessed by way of communications network 514).

Process 700 may continue to 704, where the media guidance application may determine whether the user prefers a first media asset that is presently being played back (e.g., media asset 111) to a second media asset whose playback has recently begun (e.g., media asset 115). If the user prefers the first media asset, process 700 continues to 706, and if the user prefers the second media asset, process 700 continues to 718. Any of the following elements of process 700 are optional and may be omitted.

At 706, the media guidance application may determine whether buffering of media assets is enabled (e.g., either by default or user-set settings, or based on a dynamic determination based on user habits, as described above). If buffering is in fact enabled, the media guidance application may proceed to 708, and if it is not enabled (or if it is unavailable), the media guidance application may proceed to 714.

At 708, the media guidance application may buffer the portion of the playback of the second media asset that overlaps with a remainder of media asset 111, thus ensuring that the user will not miss any or much of media asset 115. Process 700 may then proceed to 710, where the media guidance application detects an end to playback of media asset 111, and may go on to 712, where the media guidance application plays back media asset 115 from a beginning of the buffered portion. These elements may be performed consistent with any manner described above.

At 714 (where media asset buffering is not enabled), the media guidance application may detect an end to the playback of the first media asset, and may play back the second media asset from an intermediate position of the second media asset that coincides with a time at which playback of the first media asset ended. As an example, at time t2, which is when media asset 111 ends, a portion of media asset 115 has already elapsed. That portion will not be played back to the user because buffering will not occur, and playback of media asset 115 will occur at time t2.

Process 700 may continue to 718 (from 704), where the media guidance application may determine whether the user prefers to play back an entirety of a given media asset even if user does not prefer the given media to a different media. For example, the user may not like when a song or video is chopped even when an alternative song or video he likes more is available. If the user does not prefer to play back an entirety of a given media asset, process 700 may continue to 720, where the media guidance application may switch from media stream 101 to media stream 105 prior to detecting an end to the playback of media asset 111 (e.g., at time t1). However, if the user does prefer to play back an entirety of the given media asset, process 700 may continue to 722, where media asset 115 may optionally be buffered, and then to 724, where the media guidance application may refrain from playing back media asset 115 until an end to playback of the first media asset is detected (e.g., until time t2).

It should be noted that processes 600-700 or any step thereof could be performed on, or provided by, any of the devices shown in FIGS. 4-5, and any device that effects the functions related to FIG. 1 that are described above. For example, any of processes 600-700 may be executed by control circuitry 404 (FIG. 4) as instructed by control circuitry implemented on user equipment 502, 504, and/or 506 (FIG. 5) in order to switch between media streams. In addition, one or more steps of processes 600-700 may be incorporated into or combined with one or more steps of any other process or embodiment.

It is contemplated that the steps or descriptions of each of FIGS. 6-7 may be used with any other embodiment of this disclosure. In addition, the steps and descriptions described in relation to FIGS. 6-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, switching between media streams 101-105 may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings associated with a user, such as profile settings, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention" or "related art," any such reference is merely for the purpose of providing context to the invention(s) of the instant disclosure, and does not form any admission as to what constitutes the state of the art. Moreover, for the avoidance of doubt, while the disclosure is generally described with respect to songs, this is for illustrative purposes, the media assets may be any media asset described herein, including videos.

What is claimed is:

1. A method for avoiding playback of an advertisement by selectively switching between media streams, the method comprising:
   receiving a plurality of media streams, wherein each media stream of the plurality of media streams is received from a different source;
   switching to a first media stream of the plurality of media streams;
   playing back a first media asset of the first media stream;
   determining that an end to playback of the first media asset is imminent wherein determining that the end of the playback of the first media asset comprises:
      determining an identity of the first media asset;
      determining a length of the first media asset by, using a database, looking up the length in an entry of the database that corresponds to the identity;
      determining, based on the length, whether a threshold amount of the first media asset has yet to be played back; and
      in response to determining that the threshold amount of the first media asset has yet to be played back, determining that the end to the playback of the first media is imminent;
   in response to determining that the end to the playback of the first media asset is imminent, determining whether a second media stream of the plurality of media streams is within a threshold amount of time of playing back a beginning of a second media asset; and
   in response to determining that the second media stream is within the threshold amount of time of playing back the beginning of the second media asset:
      switching from the first media stream to the second media stream; and
      playing back the second media asset.

2. The method of claim 1, further comprising:
   accessing a profile of a user to whom the first media asset is being played back;
   determining, based on data of the profile, whether the user prefers the first media asset or the second media asset; and
   performing an action that affects playback of at least one of the first media asset and the second media asset based on the determination of whether the user prefers the first media asset or the second media asset.

3. The method of claim 2, wherein a portion of the playback of the first media asset overlaps with a portion of the playback of the second media asset, wherein determining whether the user prefers the first media asset or the second media asset comprises determining that the user prefers the first media asset, and wherein performing the action that affects playback of at least one of the first media asset and the second media asset comprises, in response to determining that the user prefers the first media asset:
   buffering the portion of the playback of the second media asset;
   detecting an end to the playback of the first media asset; and
   in response to detecting the end to the playback of the first media asset, playing back the second media asset from a beginning of the buffered portion.

4. The method of claim 2, wherein a portion of the playback of the first media asset overlaps with a portion of the playback of the second media asset, wherein determining whether the user prefers the first media asset or the second media asset comprises determining that the user prefers the second media asset, and wherein performing the action that affects playback of at least one of the first media asset and the second media asset comprises, in response to determining that the user prefers the second media asset, switching from the first media stream to the second media stream prior to detecting an end to the playback of the first media asset.

5. The method of claim 4, further comprising:
   determining, based on the user profile, whether a user prefers to play back an entirety of a given media even if user does not prefer the given media to a different media; and
   in response to determining that the user prefers to play back the entirety of the given media even if the user does not prefer the given media to the different media, refraining from performing the action that affects playback of at least one of the first media asset and the second media asset.

6. The method of claim 1, wherein determining whether the second media stream of the plurality of media streams is within a threshold amount of time of playing back a beginning of a second media asset comprises:
   determining that the second media stream is within the threshold amount of time of playing back the beginning of the second media asset, and also determining that a third media stream of the plurality of media streams is within the threshold amount of time of playing back the beginning of a third media asset;
   in response to determining that the second media stream is within the threshold amount of time of playing back the beginning of the second media asset, and also in response to determining that the third media stream of the plurality of media streams is within the threshold amount of time of playing back the beginning of the third media asset, determining, based on a profile of a user to whom the first media asset is being played back, that the user prefers the third media asset to the second media asset; and
   in response to determining that the user prefers the third media asset to the second media asset, switching from the first media stream to the third media stream.

7. The method of claim 1, further comprising:
   determining that the second media stream is not within the threshold amount of time of playing back the beginning of the second media asset;
   in response to determining that the second media stream is not within the threshold amount of time of playing back the beginning of the second media asset:
      determining whether any media stream of the plurality of media streams is playing back non-advertisement media; and
      in response to determining that a media stream is playing back the non-advertisement media, upon playback of the first media asset ending, switching from the first media stream to the media stream that is playing back the non-advertisement media.

8. The method of claim 7, further comprising:
   determining that no media stream of the plurality of media streams is playing back non-advertisement media; and
   in response to determining that no media stream of the plurality of media streams is playing back non-advertisement media:
      switching from the first media stream to a media source that is not a media stream; and
      playing back a third media asset from the media source that is not the media stream.

9. A system for avoiding playback of an advertisement by selectively switching between media streams, the system comprising:
communications circuitry; and
control circuitry configured to:
receive, using the communications circuitry, a plurality of media streams, wherein each media stream of the plurality of media streams is received from a different source;
switch to a first media stream of the plurality of media streams;
play back a first media asset of the first media stream;
determine that an end to playback of the first media asset is imminent by:
determining an identity of the first media asset;
determining a length of the first media asset by, using a database, looking up the length in an entry of the database that corresponds to the identity;
determining, based on the length, whether a threshold amount of the first media asset has yet to be played back; and
in response to determining that the threshold amount of the first media asset has yet to be played back, determining that the end to the playback of the first media is imminent;
in response to determining that the end to the playback of the first media asset is imminent, determine whether a second media stream of the plurality of media streams is within a threshold amount of time of playing back a beginning of a second media asset; and
in response to determining that the second media stream is within the threshold amount of time of playing back the beginning of the second media asset:
switch from the first media stream to the second media stream; and
play back the second media asset.

10. The system of claim 9, wherein the control circuitry is further configured to:
access a profile of a user to whom the first media asset is being played back;
determine, based on data of the profile, whether the user prefers the first media asset or the second media asset; and
perform an action that affects playback of at least one of the first media asset and the second media asset based on the determination of whether the user prefers the first media asset or the second media asset.

11. The system of claim 10, wherein a portion of the playback of the first media asset overlaps with a portion of the playback of the second media asset, wherein the control circuitry is further configured, when determining whether the user prefers the first media asset or the second media asset, to determine that the user prefers the first media asset, and wherein the control circuitry is further configured, when performing the action that affects playback of at least one of the first media asset and the second media asset, to, in response to determining that the user prefers the first media asset:
buffer the portion of the playback of the second media asset;
detect an end to the playback of the first media asset; and
in response to detecting the end to the playback of the first media asset, play back the second media asset from a beginning of the buffered portion.

12. The system of claim 10, wherein a portion of the playback of the first media asset overlaps with a portion of the playback of the second media asset, wherein the control circuitry is further configured, when determining whether the user prefers the first media asset or the second media asset, to determine that the user prefers the second media asset, and wherein the control circuitry is further configured, when performing the action that affects playback of at least one of the first media asset and the second media asset, to, in response to determining that the user prefers the second media asset, switch from the first media stream to the second media stream prior to detecting an end to the playback of the first media asset.

13. The system of claim 12, wherein the control circuitry is further configured to:
determine, based on the user profile, whether a user prefers to play back an entirety of a given media even if user does not prefer the given media to a different media; and
in response to determining that the user prefers to play back the entirety of the given media even if the user does not prefer the given media to the different media, refrain from performing the action that affects playback of at least one of the first media asset and the second media asset.

14. The system of claim 9, wherein the control circuitry is further configured, when determining whether the second media stream of the plurality of media streams is within a threshold amount of time of playing back a beginning of a second media asset, to:
determine that the second media stream is within the threshold amount of time of playing back the beginning of the second media asset, and also determine that a third media stream of the plurality of media streams is within the threshold amount of time of playing back the beginning of a third media asset;
in response to determining that the second media stream is within the threshold amount of time of playing back the beginning of the second media asset, and also in response to determining that the third media stream of the plurality of media streams is within the threshold amount of time of playing back the beginning of the third media asset, determine, based on a profile of a user to whom the first media asset is being played back, that the user prefers the third media asset to the second media asset; and
in response to determining that the user prefers the third media asset to the second media asset, switch from the first media stream to the third media stream.

15. The system of claim 9, wherein the control circuitry is further configured to:
determine that the second media stream is not within the threshold amount of time of playing back the beginning of the second media asset;
in response to determining that the second media stream is not within the threshold amount of time of playing back the beginning of the second media asset:
determine whether any media stream of the plurality of media streams is playing back non-advertisement media; and
in response to determining that a media stream is playing back the non-advertisement media, upon playback of the first media asset ending, switch from the first media stream to the media stream that is playing back the non-advertisement media.

16. The system of claim 15, wherein the control circuitry is further configured to:
  determine that no media stream of the plurality of media streams is playing back non-advertisement media; and
  in response to determining that no media stream of the plurality of media streams is playing back non-advertisement media:
    switch from the first media stream to a media source that is not a media stream; and
    play back a third media asset from the media source that is not the media stream.

17. A method for avoiding playback of an advertisement by selectively switching between media streams, the method comprising:
  receiving a plurality of media streams, wherein each media stream of the plurality of media streams is received from a different source;
  switching to a first media stream of the plurality of media streams;
  playing back a first media asset of the first media stream;
  determining that an end to playback of the first media asset is imminent;
  in response to determining that the end to the playback of the first media asset is imminent, determining whether a second media stream of the plurality of media streams is within a threshold amount of time of playing back a beginning of a second media asset, wherein the first media asset overlaps with a portion of playback of the second media asset;
  accessing a profile of a user to whom the first media asset is being played back;
  determining, based on data of the profile, that the user prefers the first media asset;
  in response to determining that the second media stream is within the threshold amount of time of playing back the beginning of the second media asset and in response determining that the user prefers the first media asset:
    buffering the portion of the playback of the second media asset;
    detecting an end to the playback of the first media asset; and
    in response to detecting the end to the playback of the first media asset:
      switching from the first media stream to the second media stream; and
      playing back the second media asset from a beginning of the buffered portion.

18. The method of claim 17, wherein determining that the end to the playback of the first media is imminent comprises:
  determining an identity of the first media asset;
  determining a length of the first media asset by, using a database, looking up the length in an entry of the database that corresponds to the identity;
  determining, based on the length, whether a threshold amount of the first media asset has yet to be played back; and
  in response to determining that the threshold amount of first media asset has yet to be played back, determining that the end to the playback of the first media is imminent.

19. The method of claim 17, wherein determining that the end to the playback of the first media asset is imminent comprises:
  detecting a trigger signal in the first media stream; and
  in response to detecting the trigger signal, determining that the end to the playback of the first media asset is imminent.

20. The method of claim 17, wherein determining whether the second media stream of the plurality of media streams is within a threshold amount of time of playing back a beginning of a second media asset comprises:
  determining that the second media stream is within the threshold amount of time of playing back the beginning of the second media asset, and also determining that a third media stream of the plurality of media streams is within the threshold amount of time of playing back the beginning of a third media asset;
  in response to determining that the second media stream is within the threshold amount of time of playing back the beginning of the second media asset, and also in response to determining that the third media stream of the plurality of media streams is within the threshold amount of time of playing back the beginning of the third media asset, determining, based on a profile of a user to whom the first media asset is being played back, that the user prefers the second media asset to the third media asset; and
  wherein switching from the first media stream to the second media stream is in further response to determining that the user prefers the second media asset to the third media asset.

21. The method of claim 17, further comprising:
  determining that the second media stream is not within the threshold amount of time of playing back the beginning of the second media asset;
  in response to determining that the second media stream is not within the threshold amount of time of playing back the beginning of the second media asset:
    determining whether any media stream of the plurality of media streams is playing back non-advertisement media; and
    in response to determining that a media stream is playing back the non-advertisement media, upon playback of the first media asset ending, switching from the first media stream to the media stream that is playing back the non-advertisement media.

22. The method of claim 21, further comprising:
  determining that no media stream of the plurality of media streams is playing back non-advertisement media; and
  in response to determining that no media stream of the plurality of media streams is playing back non-advertisement media:
    switching from the first media stream to a media source that is not a media stream; and
    playing back a third media asset from the media source that is not the media stream.

23. A system for avoiding playback of an advertisement by selectively switching between media streams, the system comprising:
  communications circuitry; and
  control circuitry configured to:
    receive, using the communications circuitry, a plurality of media streams, wherein each media stream of the plurality of media streams is received from a different source;
    switch to a first media stream of the plurality of media streams;
    play back a first media asset of the first media stream;
    determine that an end to playback of the first media asset is imminent;
    in response to determining that the end to the playback of the first media asset is imminent, determine whether a second media stream of the plurality of media streams is within a threshold amount of time of playing back a beginning of a second media asset, wherein the first media asset overlaps with a portion of playback of the second media asset;

access a profile of a user to whom the first media asset is being played back;

determine, based on data of the profile, that the user prefers the first media asset;

in response to determining that the second media stream is within the threshold amount of time of playing back the beginning of the second media asset and in response to determining that the user prefers the first media asset:

buffer the portion of the playback of the second media asset;

detect an end to the playback of the first media asset; and in response to detecting the end to the playback of the first media asset:

switch from the first media stream to the second media stream; and play back the second media asset from a beginning of the buffered portion.

24. The system of claim 23, wherein the control circuitry is further configured, when determining that the end to the playback of the first media is imminent, to:

determine an identity of the first media asset;

determine a length of the first media asset by, using a database, looking up the length in an entry of the database that corresponds to the identity;

determine, based on the length, whether a threshold amount of the first media asset has yet to be played back; and in response to determining that the threshold amount of first media asset has yet to be played back, determine that the end to the playback of the first media is imminent.

25. The system of claim 23, wherein the control circuitry is further configured, when determining that the end to the playback of the first media asset is imminent, to:

detect a trigger signal in the first media stream; and in response to detecting the trigger signal, determine that the end to the playback of the first media asset is imminent.

26. The system of claim 23, wherein the control circuitry is further configured, when determining whether the second media stream of the plurality of media streams is within a threshold amount of time of playing back a beginning of a second media asset, to:

determine that the second media stream is within the threshold amount of time of playing back the beginning of the second media asset, and also determine that a third media stream of the plurality of media streams is within the threshold amount of time of playing back the beginning of a third media asset;

in response to determining that the second media stream is within the threshold amount of time of playing back the beginning of the second media asset, and also in response to determining that the third media stream of the plurality of media streams is within the threshold amount of time of playing back the beginning of the third media asset, determine, based on a profile of a user to whom the first media asset is being played back, that the user prefers the second media asset to the third media asset; and wherein switching from the first media stream to the second media stream is in further response to determining that the user prefers the second media asset to the third media asset.

27. The system of claim 23, wherein the control circuitry is further configured to:

determine that the second media stream is not within the threshold amount of time of playing back the beginning of the second media asset;

in response to determining that the second media stream is not within the threshold amount of time of playing back the beginning of the second media asset:

determine whether any media stream of the plurality of media streams is playing back non-advertisement media; and in response to determining that a media stream is playing back the non-advertisement media, upon playback of the first media asset ending, switch from the first media stream to the media stream that is playing back the non-advertisement media.

28. The system of claim 27, wherein the control circuitry is further configured to:

determine that no media stream of the plurality of media streams is playing back non-advertisement media; and in response to determining that no media stream of the plurality of media streams is playing back non-advertisement media:

switch from the first media stream to a media source that is not a media stream; and play back a third media asset from the media source that is not the media stream.

29. A method for avoiding playback of an advertisement by selectively switching between media streams, the method comprising:

receiving a plurality of media streams, wherein each media stream of the plurality of media streams is received from a different source;

switching to a first media stream of the plurality of media streams;

playing back a first media asset of the first media stream;

determining that an end to playback of the first media asset is imminent;

in response to determining that the end to the playback of the first media asset is imminent, determining whether a second media stream of the plurality of media streams is within a threshold amount of time of playing back a beginning of a second media asset, wherein determining whether the second media stream of the plurality of media streams is within a threshold amount of time of playing back a beginning of a second media asset comprises:

determining that the second media stream is within the threshold amount of time of playing back the beginning of the second media asset, and also determining that a third media stream of the plurality of media streams is within the threshold amount of time of playing back the beginning of a third media asset; and in response to determining that the second media stream is within the threshold amount of time of playing back the beginning of the second media asset, and also in response to determining that the third media stream of the plurality of media streams is within the threshold amount of time of playing back the beginning of the third media asset, determining, based on a profile of a user to whom the first media asset is being played back, that the user prefers the second media asset to the third media asset; and in response to determining that the second media stream is within the threshold amount of time of playing back the beginning of the second media asset and in response to determining that the user prefers the second media asset to the third media asset:
switching from the first media stream to the second media stream; and
playing back the second media asset.

30. The method of claim 29, wherein determining that the end to the playback of the first media is imminent comprises:
determining an identity of the first media asset;
determining a length of the first media asset by, using a database, looking up the length in an entry of the database that corresponds to the identity;
determining, based on the length, whether a threshold amount of the first media asset has yet to be played back; and
in response to determining that the threshold amount of first media asset has yet to be played back, determining that the end to the playback of the first media is imminent.

31. The method of claim 29, wherein determining that the end to the playback of the first media asset is imminent comprises:
detecting a trigger signal in the first media stream; and
in response to detecting the trigger signal, determining that the end to the playback of the first media asset is imminent.

32. The method of claim 29, further comprising:
accessing a profile of a user to whom the first media asset is being played back;
determining, based on data of the profile, whether the user prefers the first media asset or the second media asset; and
performing an action that affects playback of at least one of the first media asset and the second media asset based on the determination of whether the user prefers the first media asset or the second media asset.

33. The method of claim 32, wherein a portion of the playback of the first media asset overlaps with a portion of the playback of the second media asset, wherein determining whether the user prefers the first media asset or the second media asset comprises determining that the user prefers the first media asset, and wherein performing the action that affects playback of at least one of the first media asset and the second media asset comprises, in response to determining that the user prefers the first media asset:
buffering the portion of the playback of the second media asset;
detecting an end to the playback of the first media asset; and
in response to detecting the end to the playback of the first media asset, playing back the second media asset from a beginning of the buffered portion.

34. The method of claim 32, wherein a portion of the playback of the first media asset overlaps with a portion of the playback of the second media asset, wherein determining whether the user prefers the first media asset or the second media asset comprises determining that the user prefers the second media asset, and wherein performing the action that affects playback of at least one of the first media asset and the second media asset comprises, in response to determining that the user prefers the second media asset, switching from the first media stream to the second media stream prior to detecting an end to the playback of the first media asset.

35. The method of claim 34, further comprising:
determining, based on the user profile, whether a user prefers to play back an entirety of a given media even if user does not prefer the given media to a different media; and
in response to determining that the user prefers to play back the entirety of the given media even if the user does not prefer the given media to the different media, refraining from performing the action that affects playback of at least one of the first media asset and the second media asset.

36. The method of claim 29, further comprising:
determining that the second media stream is not within the threshold amount of time of playing back the beginning of the second media asset;
in response to determining that the second media stream is not within the threshold amount of time of playing back the beginning of the second media asset:
determining whether any media stream of the plurality of media streams is playing back non-advertisement media; and
in response to determining that a media stream is playing back the non-advertisement media, upon playback of the first media asset ending, switching from the first media stream to the media stream that is playing back the non-advertisement media.

37. The method of claim 36, further comprising:
determining that no media stream of the plurality of media streams is playing back non-advertisement media; and
in response to determining that no media stream of the plurality of media streams is playing back non-advertisement media:
switching from the first media stream to a media source that is not a media stream; and
playing back a third media asset from the media source that is not the media stream.

38. A system for avoiding playback of an advertisement by selectively switching between media streams, the system comprising:
communications circuitry; and
control circuitry configured to:
receive, using the communications circuitry, a plurality of media streams, wherein each media stream of the plurality of media streams is received from a different source;
switch to a first media stream of the plurality of media streams;
play back a first media asset of the first media stream;
determine that an end to playback of the first media asset is imminent;
in response to determining that the end to the playback of the first media asset is imminent, determine whether a second media stream of the plurality of media streams is within a threshold amount of time of playing back a beginning of a second media asset by:
determining that the second media stream is within the threshold amount of time of playing back the beginning of the second media asset, and also determining that a third media stream of the plurality of media streams is within the threshold amount of time of playing back the beginning of a third media asset; and
in response to determining that the second media stream is within the threshold amount of time of playing back the beginning of the second media asset, and also in response to determining that the third media stream of the plurality of media streams is within the threshold amount of time of playing back the beginning of the third media asset, determining, based on a profile of a user to whom the first media asset is being played back, that the user prefers the second media asset to the third media asset; and in response to determining that the second media stream is within the threshold amount of time of playing back the beginning of the second media asset and in response to determining that the user prefers the second media asset to the third media asset:
switch from the first media stream to the second media stream; and
play back the second media asset.

39. The system of claim 38, wherein the control circuitry is further configured, when determining that the end to the playback of the first media is imminent, to:
determine an identity of the first media asset;
determine a length of the first media asset by, using a database, looking up the length in an entry of the database that corresponds to the identity;
determine, based on the length, whether a threshold amount of the first media asset has yet to be played back; and
in response to determining that the threshold amount of first media asset has yet to be played back, determine that the end to the playback of the first media is imminent.

40. The system of claim 38, wherein the control circuitry is further configured, when determining that the end to the playback of the first media asset is imminent, to:
detect a trigger signal in the first media stream; and
in response to detecting the trigger signal, determine that the end to the playback of the first media asset is imminent.

41. The system of claim 38, wherein the control circuitry is further configured to:
access a profile of a user to whom the first media asset is being played back;
determine, based on data of the profile, whether the user prefers the first media asset or the second media asset; and
perform an action that affects playback of at least one of the first media asset and the second media asset based on the determination of whether the user prefers the first media asset or the second media asset.

42. The system of claim 41, wherein a portion of the playback of the first media asset overlaps with a portion of the playback of the second media asset, wherein the control circuitry is further configured, when determining whether the user prefers the first media asset or the second media asset, to determine that the user prefers the first media asset, and wherein the control circuitry is further configured, when performing the action that affects playback of at least one of the first media asset and the second media asset, to, in response to determining that the user prefers the first media asset:
buffer the portion of the playback of the second media asset;

detect an end to the playback of the first media asset; and
in response to detecting the end to the playback of the first media asset, play back the second media asset from a beginning of the buffered portion.

43. The system of claim 41, wherein a portion of the playback of the first media asset overlaps with a portion of the playback of the second media asset, wherein the control circuitry is further configured, when determining whether the user prefers the first media asset or the second media asset, to determine that the user prefers the second media asset, and wherein the control circuitry is further configured, when performing the action that affects playback of at least one of the first media asset and the second media asset, to, in response to determining that the user prefers the second media asset, switch from the first media stream to the second media stream prior to detecting an end to the playback of the first media asset.

44. The system of claim 43, wherein the control circuitry is further configured to:
determine, based on the user profile, whether a user prefers to play back an entirety of a given media even if user does not prefer the given media to a different media; and
in response to determining that the user prefers to play back the entirety of the given media even if the user does not prefer the given media to the different media, refrain from performing the action that affects playback of at least one of the first media asset and the second media asset.

45. The system of claim 38, wherein the control circuitry is further configured to:
determine that the second media stream is not within the threshold amount of time of playing back the beginning of the second media asset;
in response to determining that the second media stream is not within the threshold amount of time of playing back the beginning of the second media asset:
determine whether any media stream of the plurality of media streams is playing back non-advertisement media; and
in response to determining that a media stream is playing back the non-advertisement media, upon playback of the first media asset ending, switch from the first media stream to the media stream that is playing back the non-advertisement media.

46. The system of claim 45, wherein the control circuitry is further configured to:
determine that no media stream of the plurality of media streams is playing back non-advertisement media; and
in response to determining that no media stream of the plurality of media streams is playing back non-advertisement media:
switch from the first media stream to a media source that is not a media stream; and
play back a third media asset from the media source that is not the media stream.

* * * * *